Nov. 21, 1961 E. LESAVOY 3,009,161
UNITARY INSERT STRUCTURE FOR SHIRTS AND THE LIKE
Filed March 11, 1960 10 Sheets-Sheet 1

INVENTOR:
Ely Lesavoy,
BY
Alfred E. Ischinger
ATTORNEY.

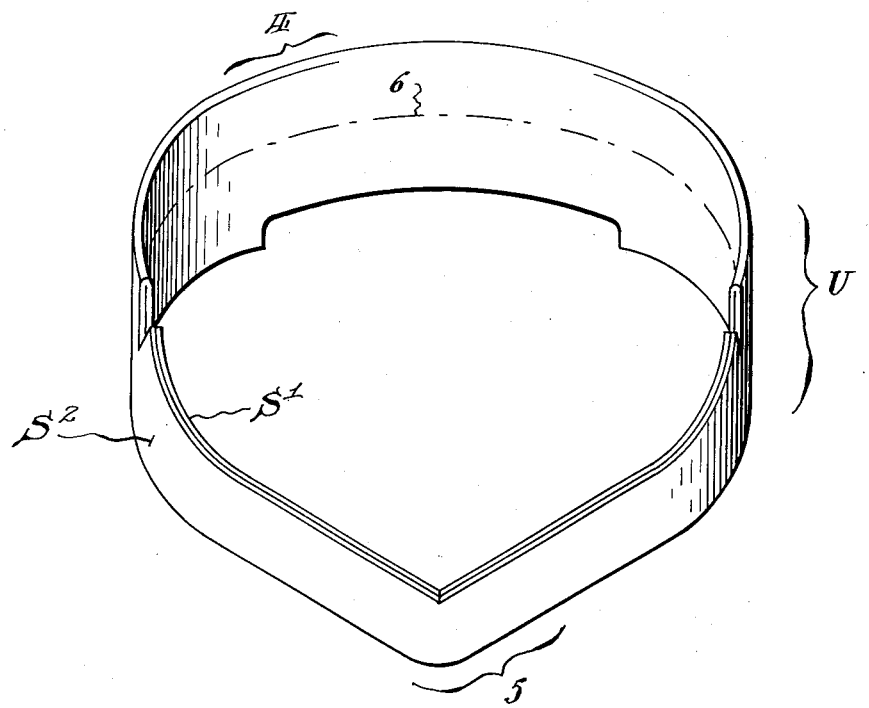
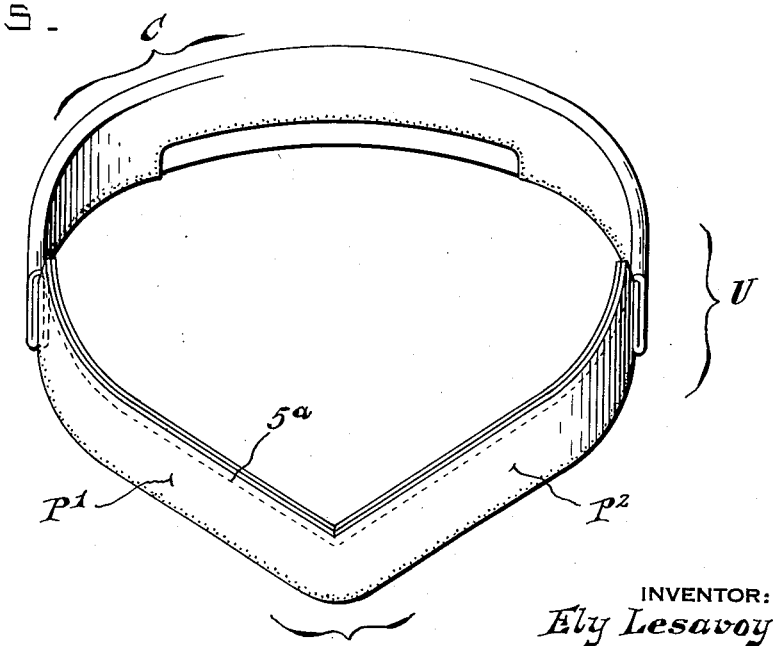

Nov. 21, 1961 E. LESAVOY 3,009,161
UNITARY INSERT STRUCTURE FOR SHIRTS AND THE LIKE
Filed March 11, 1960 10 Sheets-Sheet 3
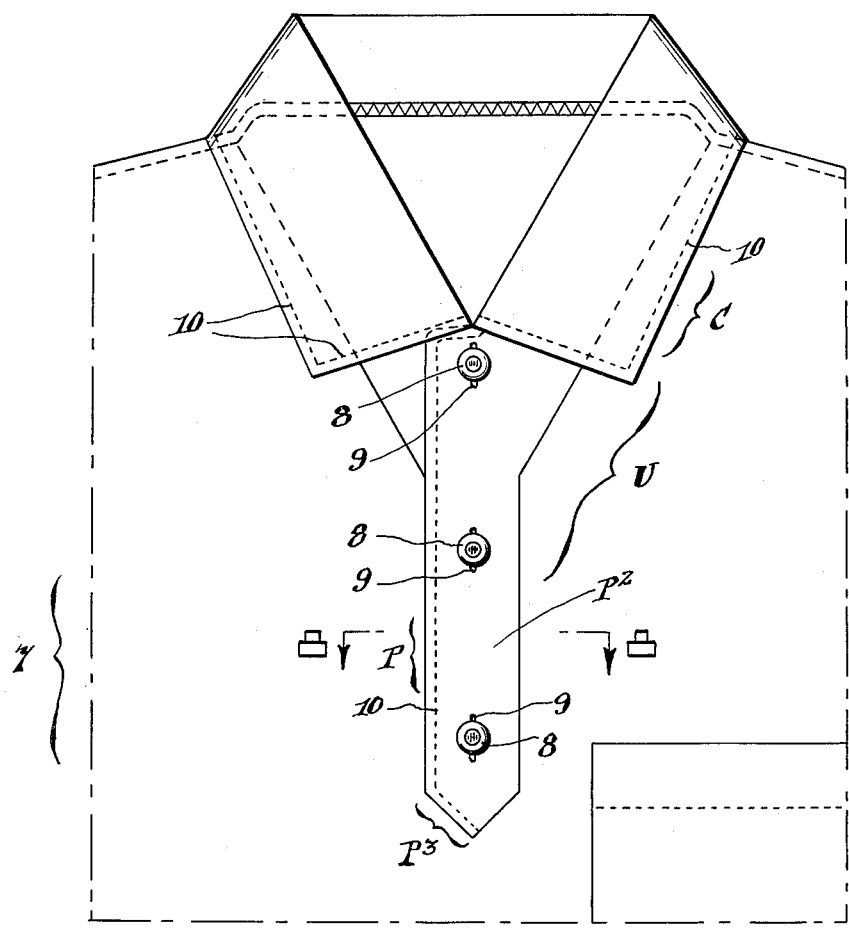
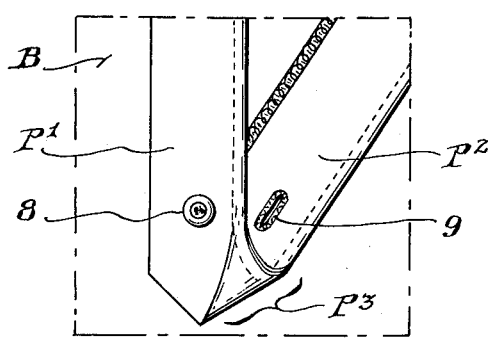
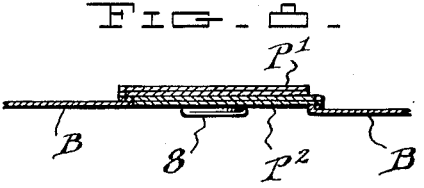
INVENTOR:
Ely Lesavoy,
BY
Alfred E. Ischinger
ATTORNEY.

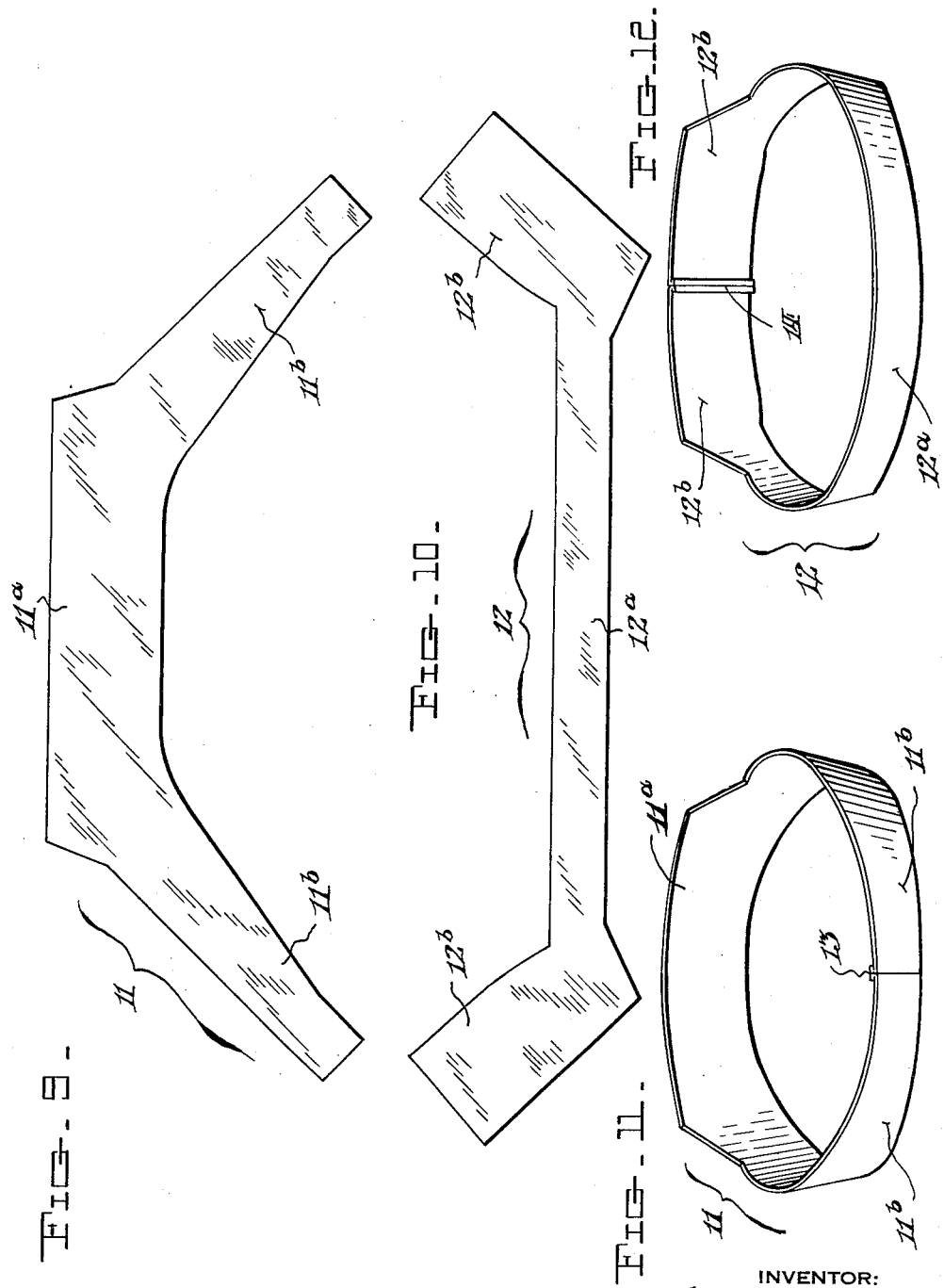

Nov. 21, 1961     E. LESAVOY     3,009,161
UNITARY INSERT STRUCTURE FOR SHIRTS AND THE LIKE
Filed March 11, 1960     10 Sheets-Sheet 5
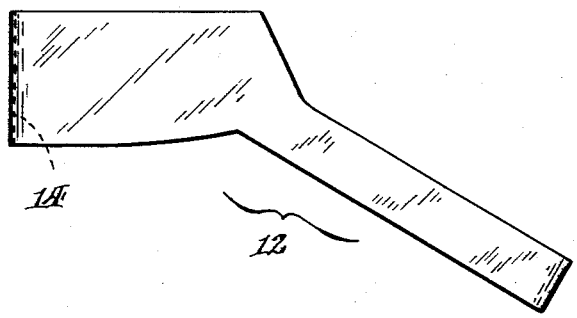
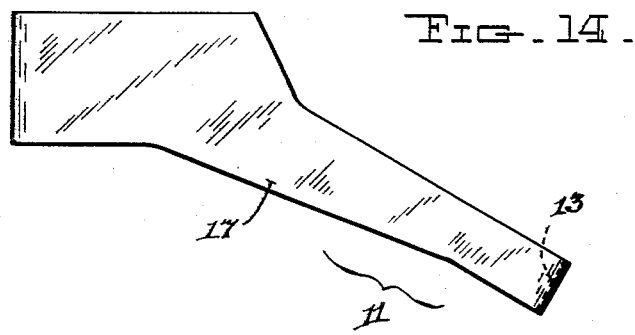
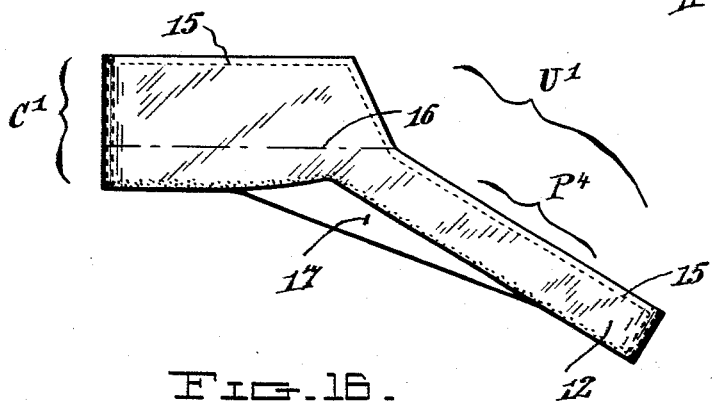
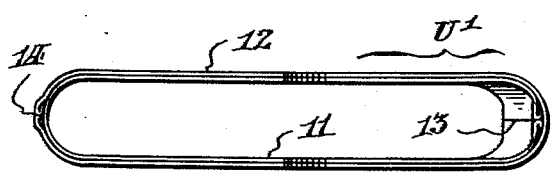
INVENTOR:
Ely Lesavoy,
BY
Alfred E. Jschinger
ATTORNEY.

Nov. 21, 1961  E. LESAVOY  3,009,161
UNITARY INSERT STRUCTURE FOR SHIRTS AND THE LIKE
Filed March 11, 1960  10 Sheets-Sheet 7
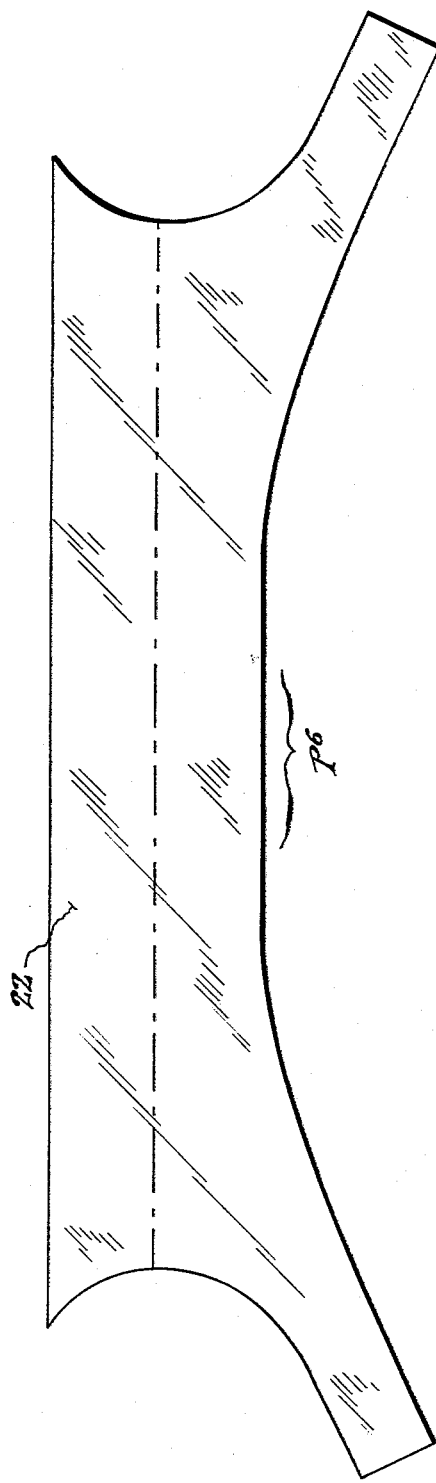
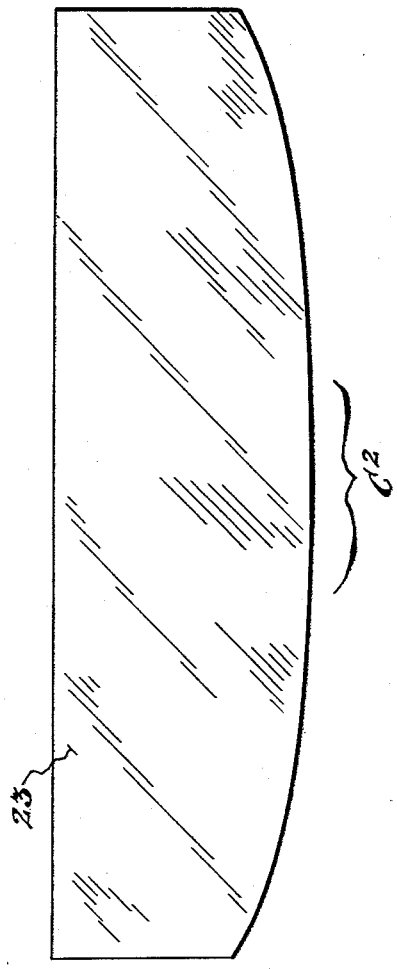
INVENTOR:
*Ely Lesavoy*
BY
*Alfred E. Ischinger*
ATTORNEY.

Nov. 21, 1961 E. LESAVOY 3,009,161
UNITARY INSERT STRUCTURE FOR SHIRTS AND THE LIKE
Filed March 11, 1960 10 Sheets-Sheet 8
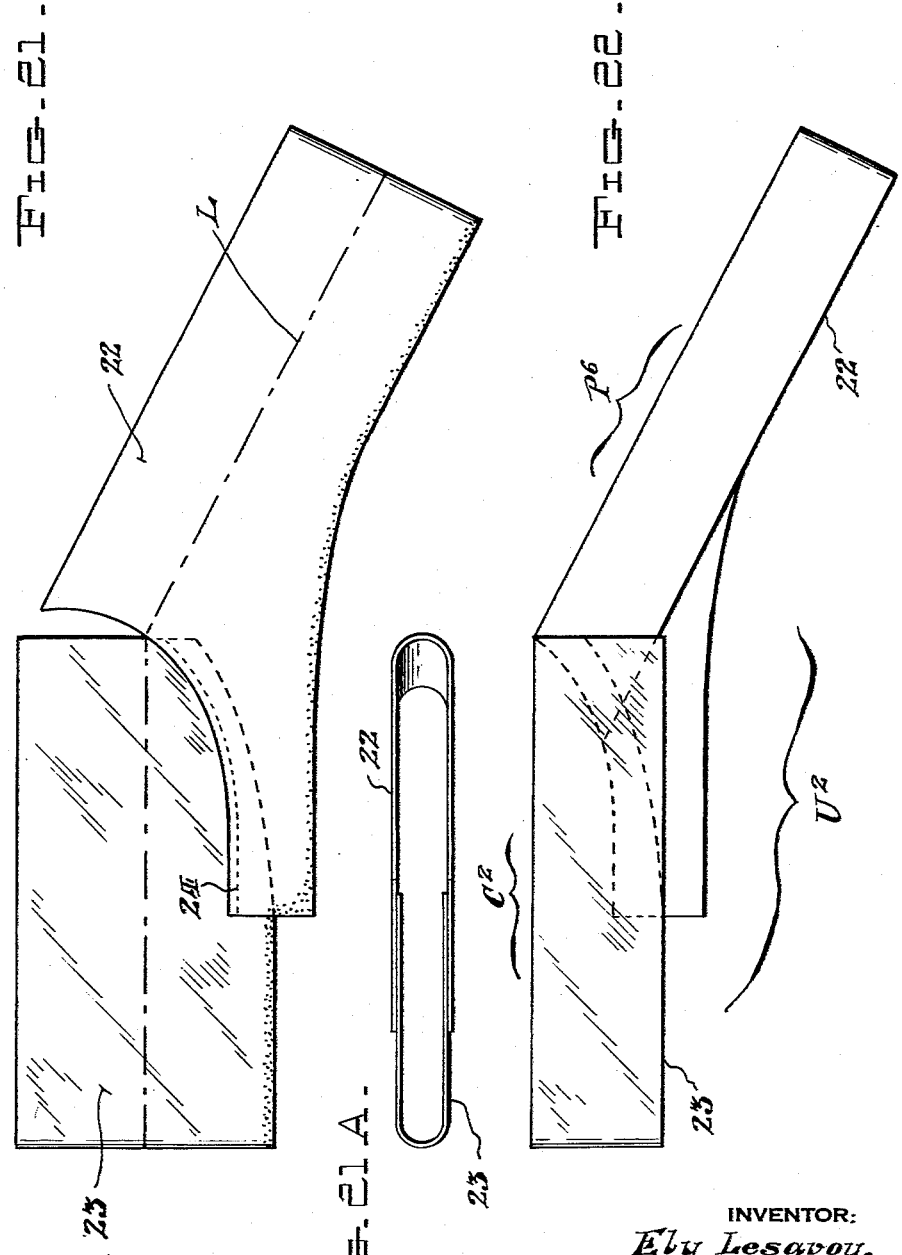
INVENTOR:
Ely Lesavoy,
BY
Alfred E. Ischinger
ATTORNEY.

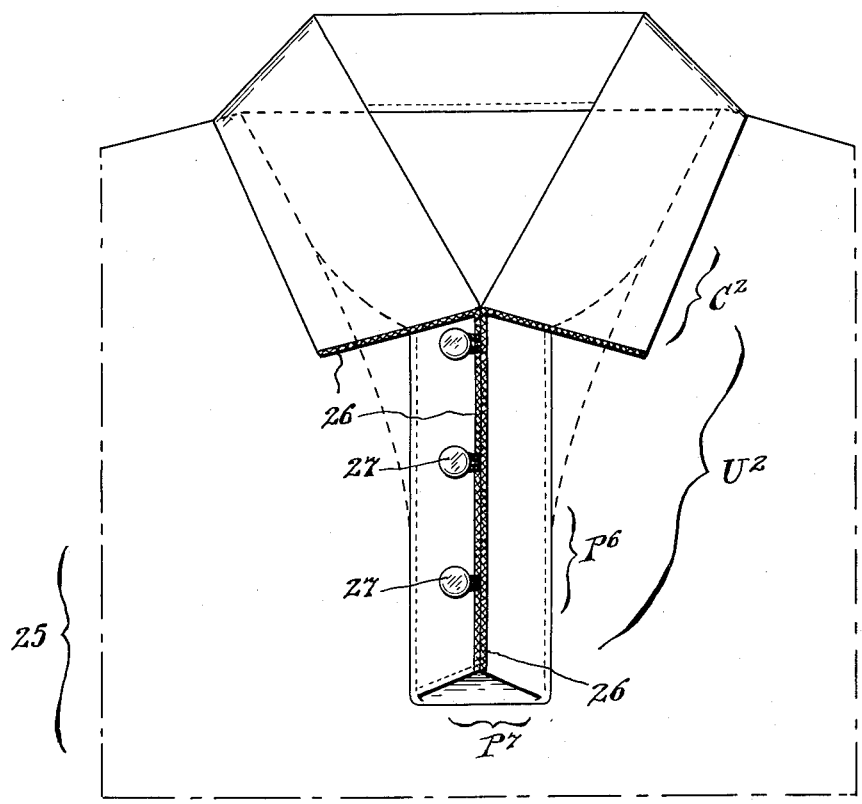
FIG_23.
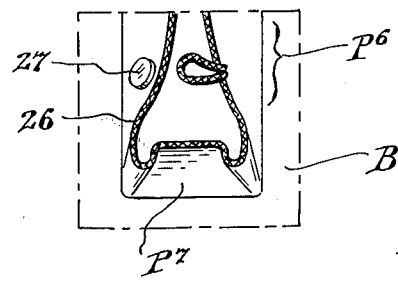
FIG_24.

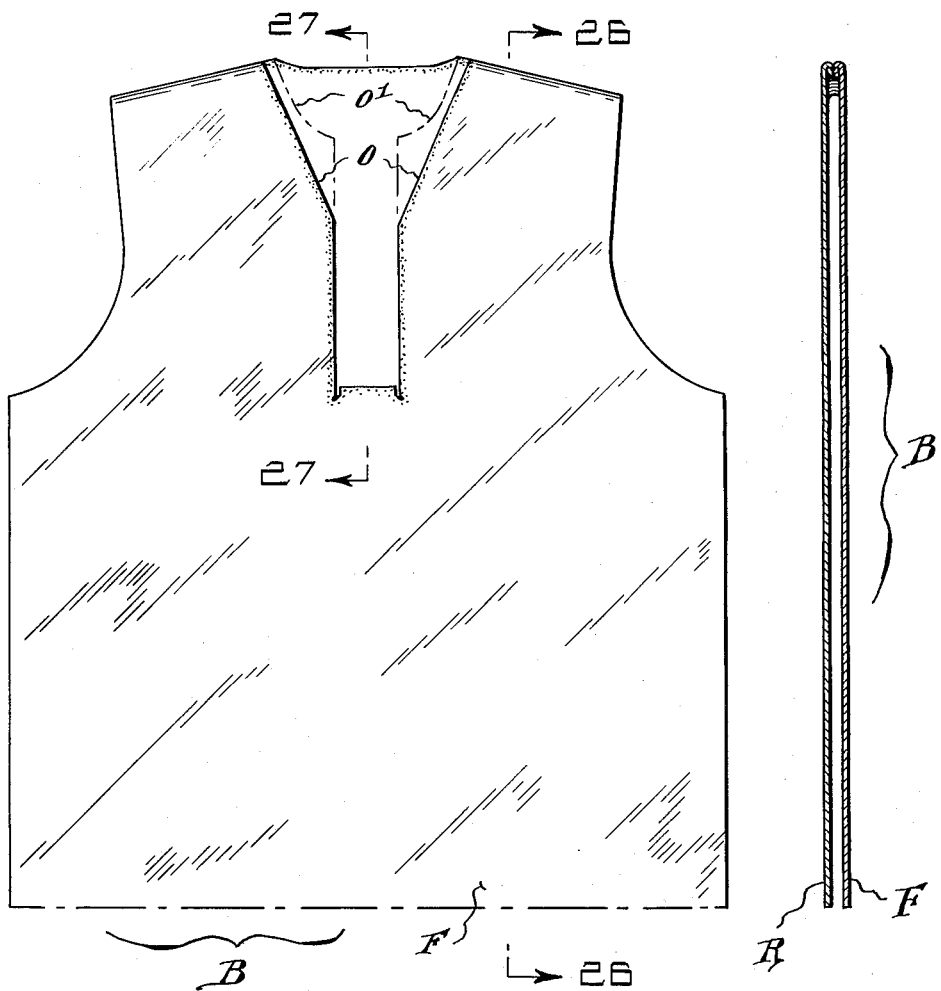
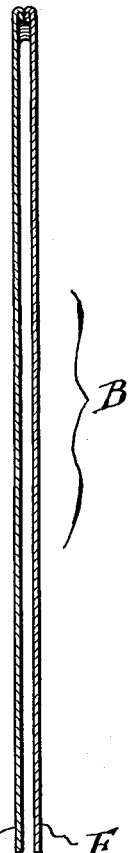
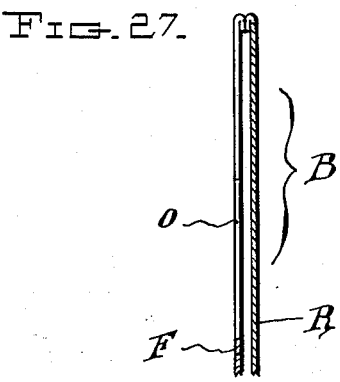

3,009,161
UNITARY INSERT STRUCTURE FOR
SHIRTS AND THE LIKE
Ely Lesavoy, 621 N. 30th St., Allentown, Pa.
Filed Mar. 11, 1960, Ser. No. 14,387
6 Claims. (Cl. 2—115)

This invention relates to articles of wearing apparel for men, women, children and infants, such, for example, as shirts having a collar and placket arrangement; and more particularly concerns unique articles of this type, as well as special insert units that are adapted to be embodied in such articles and a new manufacturing method.

One object of my invention is to provide novel articles of wearing apparel and insert units of the type indicated which embody certain structural and functional features of advantage over the similar articles and insert units of the prior art.

Another object is to provide novel single unit collar and placket insert structures or the like, which can be more easily, quickly and economically embodied in an article of wearing apparel than the separate or individual collar and placket or other similar insert structures of the prior art, and which single unit insert structures have other attributes that will effect a comparatively superior collar and placket arrangement. For example, one which is stronger, more durable, more uniform, more comfortable, that cannot be distorted or pulled out of shape, that will last the lifetime of the article with which it is combined and will otherwise serve its intended purpose in a better, more satisfactory and advantageous manner.

A further object is to provide such single unit insert structures which comprise a collar formation and a placket formation that are combined with each other so as to include a continuous or endless attaching edge arrangement.

An additional object is to provide such insert structures which can be produced from knitted tubular material, from flat woven material, or the like.

It is also an object to provide such insert structures which can be produced in substantially any collar and placket style and size combination and provided with any standard or conventional type placket closure arrangement and fastening means.

Another object is to provide such insert structures in which the lower end of the placket forming section is continuous and can be folded so as to effect any desired lower end placket design or configuration.

An additional feature resides in the provision of such insert structures that comprise a plurality of identical endless fabric or material pieces which are adapted to be inserted one within the other, with or without a lining positioned therebetween and which pieces are shaped or designed so as to be foldable to effect a continuous two or more ply collar and placket arrangement.

Another object is to provide such insert structures for a shirt-like garment or the like, which structure comprises a closed longitudinally continuous arrangement of segmental or component garment parts or elements, one of which is a collar forming part.

It is also an object to provide such insert structures in accordance with a new manufacturing method.

With these and other objects in view, which will become more readily apparent from the following detailed description of the various practical and illustration embodiments of the improvements shown in the accompanying drawings, my invention comprises the novel articles of wearing apparel, insert units, elements, features of construction and arrangement of parts in cooperative relationship, as more particularly indicated and defined by the hereto appended claims.

In the drawings:

FIGURE 1 is a plan view of a knitted tubular piece of fabric or material in flattened condition, having marked or outlined thereon, in alternately reversed repeat order, a pattern which when cut from the material will form one type of single unit collar and placket structure in accordance with my invention, one of the patterns being emphasized by parallel shade lines which also indicate the direction in which the knitted courses of the fabric extend.

FIG. 4 is a perspective view which shows the tubular fabric piece of FIG. 3 folded or doubled substantially along the dot-and-dash line of FIG. 3.

FIG. 5 is a perspective view of the knitted tubular piece of material shown in FIG. 4 after the upper portion thereof has been folded downwardly or doubled along the dot-and-dash line shown in FIG. 4; the illustration of FIG. 5 also disclosing a completed single unit collar and placket structure in accordance with my invention, substantially as it appears when derived from the pattern and folding procedure illustrated by FIGS. 1–5 inclusive.

FIG. 6 is a front view of a completed shirt having embodied therein the single unit collar and placket structure of FIG. 5, substantially as it appears after said structure has been provided with usual buttons and button holes and secured by sewing in proper relationship with a shirt body member, all in substantial accordance with the well known practice and procedure followed in the production of shirts having a collar and placket arrangement.

FIG. 7 is a front eelvational view of the lower end portion of the placket arrangement shown in FIG. 6, as it appears when unbuttoned or opened.

FIG. 8 is a fragmentary cross-sectional detail view, on an enlarged scale, taken substantially as indicated by the arrows 8—8 on FIG. 6.

FIGS. 9 and 10 are plan views of two flat pieces of woven material that are shaped and combinable to provide a modified single unit collar and placket structure in accordance with my invention.

FIG. 11 is a perspective view of the material piece shown in FIG. 9, substantially as it appears when the outer ends thereof have been seamed together and the material piece distended in circular order.

FIG. 12 is a perspective view, similar to FIG. 11, but of the material piece shown in FIG. 10, substantially as it appears when the outer ends thereof have been seamed together and the material pieces distended in circular order.

FIG. 13 is a side elevational view of the material piece shown in FIG. 12, substantially as it appears when in collapsed or flattened form.

FIG. 14 is a side elevational view of the material piece shown in FIG. 11, substantially as it appears when in collapsed or flattened form.

FIGS. 15 and 16 are, respectively, a side elevational view and a top edge view, of the material pieces shown in FIGS. 13 and 14, as they appear when one is inserted within the other and joined by sewing in accordance with my invention.

Figure 17:
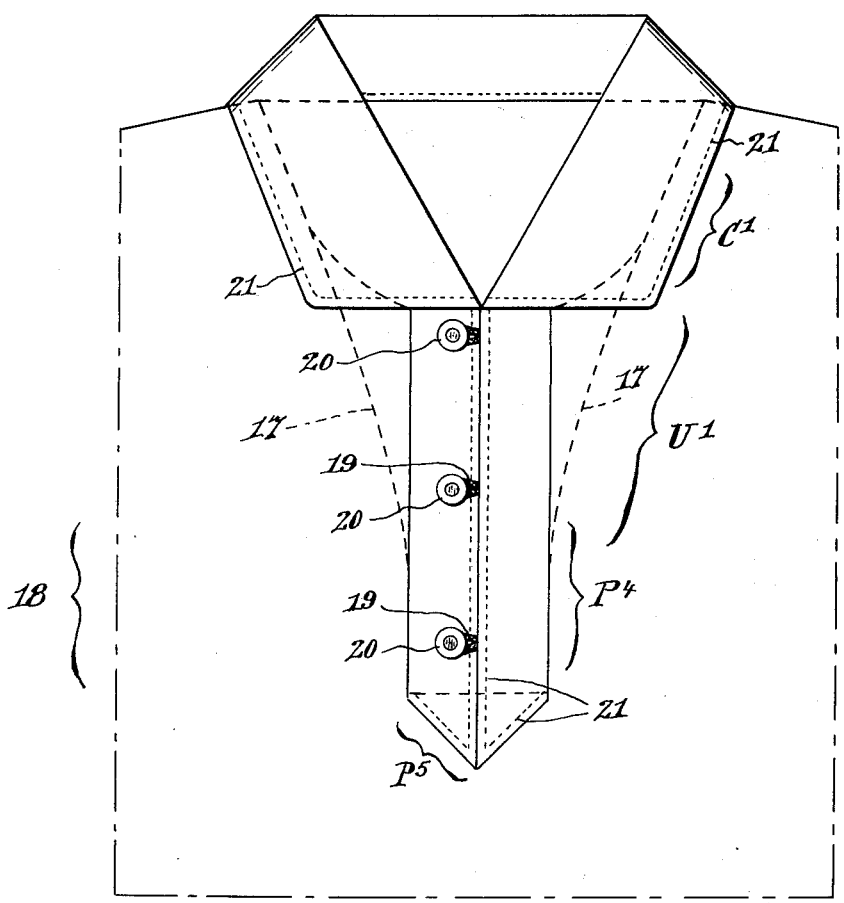

FIG. 17 is a front view of a completed shirt having embodied therein the modified single unit collar and placket structure of FIGS. 15 and 16, substantially as it appears after said structure has been provided with usual buttons and buttonholes and secured by sewing in proper relationship with a shirt body member, all in accordance with the well known practice and procedure followed in the production of shirts having a collar and placket arrangement.

Figure 18:
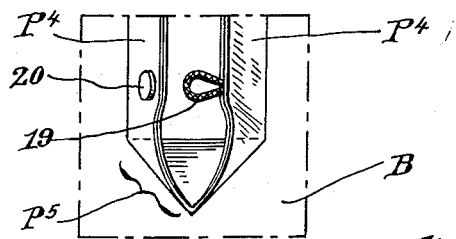

FIG. 18 is a front view of the lower end portion of the placket arrangement shown in FIG. 17, as it appears when unbuttoned or opened.

FIGS. 19 and 20 are plan views of two flat pieces of woven material that are shaped and combinable to provide another modified single unit collar and placket structure in accordance with my invention.

FIG. 21 is a side elevational view of the two pieces of material shown in FIGS. 19 and 20, after the latter have each been folded in half, joined by sewing and flattened or collapsed.

FIG. 21–A is a top edge view of FIG. 21, on a reduced scale.

FIG. 22 is a side elevational view of the material structure of FIG. 21, as it appears after the upper portions thereof that are above the dot-and-dash line in FIG. 21, have been folded downwardly.

FIG. 23 is a front view of a completed shirt having embodied therein the modified single unit collar and placket structure of FIG. 22, substantially as it appears after said structure has been provided with usual buttons and a usual buttonhole forming edge cord and secured in proper relationship with a shirt body member, all in accordance with the well known practice and procedure followed in the production of shirts having a collar and placket arrangement.

FIG. 24 is a front view of the lower end portion of the placket arrangement shown in FIG. 23, as it appears when unbuttoned or open.

FIG. 25 is a front view of a shirt body member as it appears when in the partly completed form for receiving and having attached thereto one of the single unit collar and placket structures of my invention.

FIG. 26 is a vertical sectional view, taken substantially as indicated by the arrows 26—26 on FIG. 25, and FIG. 27 is a vertical sectional view, taken substantially as indicated by the arrows 27—27 on FIG. 25.

It will facilitate an understanding of my invention to first briefly consider some of the more important aspects and phases thereof so that these may be kept in mind when subsequently reading the detailed description of the novel, practical and illustrative embodiments of my improvements depicted by the drawings. Accordingly, it is noted that the single unit garment insert structures of my invention include, for example, a collar formation and a placket formation which formations are combined with each other in such manner as to provide the structures with a continuous, or endless, attaching edge arrangement. Such unitary insert structures not only overcome the necessity of separately attaching to a garment, or shirt body member, the individual collars, plackets and other similar insert pieces of the prior art, but enable the insert attaching operation to be carried out more expeditiously, economically, quickly and efficiently. Furthermore, insert structures, which have a collar formation and placket formation combined with each other in the manner of my invention, achieve various highly desirable structure and functional results over the prior art practice and procedure that involves the attachment of separate collars and separate placket pieces. For example, it is well known in the art that shirts or other garments having individual collars and placket pieces attached thereto in separate or piecemeal fashion, are subject to certain detrimental structural weaknesses and other conditions which affect the wearing quality, comfort, life, etc. of the garment. Such weaknesses and conditions are overcome by the superior insert structures and method procedure of my invention. It will become more apparent, therefore, as the detailed description of my invention proceeds, that the novel insert structures and garments herein disclosed are comparatively stronger, more durable, more uniform, more comfortable, that they cannot be distorted or pulled out of shape, that they have better lasting qualities and otherwise serve their intended purpose in a better, more satisfactory and advantageous manner than those provided in accordance with the prior art practice.

The various combination collar and placket structures, or units, of my invention can be joined by conventional sewing procedures, with a standard type shirt body or garment part, such as exemplified by FIGS. 25–27 of the accompanying drawings, which garment part is there generally identified by the letter B.

To indicate the structural versatility of my combination collar and placket units, three practical and exemplary forms thereof are shown in the drawings and these will be respectively described under titles which refer to the embodiments in consecutive numerical order. In this connection, it is to be understood that many more unit variations can be provided in accordance with my invention, to satisfy the various structural and appearance requirements, specifications, etc. of the prevailing and future collar and placket style trends.

*Embodiment No. 1*

Figure 1:
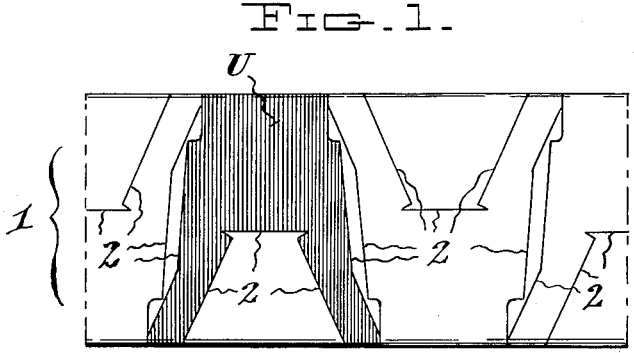
Figure 2:
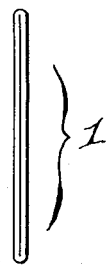
FIG. 2 is an edge view of the knitted tubular material shown in FIG. 1.

Referring now to the drawings and more particularly to FIGS. 1–8 inclusive, the practical and illustrative embodiment of my invention there shown involves a single unit insert structure that is made from a knitted tubular material identified by the numeral 1 in FIGS. 1 and 2.

The knitted tubular fabric or material 1 is of the usual type suitable for the production of collar and placket structures and the like, as embodied in modern garments, or articles of wearing apparel, for men, women, children and infants. Such tubular materials may be of a plain loop formation rib knit, or of some other loop formation that provides the desired quality, appearance and characteristics of such modern garment part structures. Tubular materials of this type are readily produceable on a variety of well known circular knitting machines, such as the Scott and Williams, Interlock, Brinton, etc.

The material 1 is placed on a horizontal table top or some other suitable surface, in the flat or collapsed condition indicated by FIG. 2, and pattern outline markings 2 are then applied to the top surface of the material, as indicated in FIG. 1, so as to establish on said surface outline configurations of individual but corresponding pattern units, in the reverse order shown, all of which units are like the line-shaded unit U. The lengthwise direction of the lines comprising the line shading of the pattern unit U indicates the direction in which the knitted courses of the tubular material 1 extend. The individual pattern units defined by the line markings 2, when cut from the material 1, will all be alike in size and shape. It will be noted that, due to the particular arrangement of the pattern unit demarcations on the tubular material 1, only a small amount of waste material will result when the pattern units are cut, or severed, from the material 1.

The procedure followed in converting each of the individual pattern units into a combined or integral collar and placket structure, is the same in each instance. This procedure will become clear from the following explanation relative to the pattern unit U.

Figure 3:
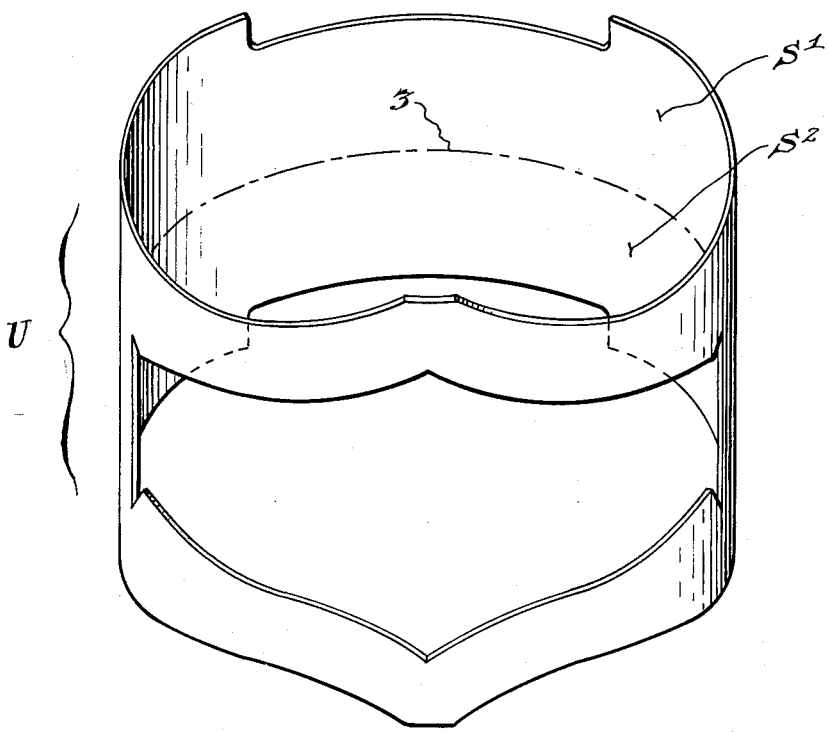
FIG. 3 is a perspective view of an opened or distended piece of knitted tubular material cut in accordance with the pattern indicated in FIG. 1.

The pattern unit U, after it is cut from the tubular material 1, is first opened, or distended, as shown in FIG. 3, so as to effect a tubular, or cylindrical material configuration having corresponding top and bottom sections $S^1$, $S^2$, that extend in opposed or reversed order beyond the dot-and-dash unit center line partly indicated in FIG. 3 and identified by the numeral 3.

The unit U is next folded along the said center line 3, so that the top section $S^1$ thereof is brought into aligned juxtaposed or inserted relation within the bottom section $S^2$, in the manner disclosed by FIG. 4. The unit U now forms a two-ply structure having a rear substantially semicircular section 4 and a front substantially semicircular section 5.

At this stage of the procedure the two-ply front section 5 has through stitching applied thereto, as indicated at 5$^a$ in FIG. 5, so that the inner and outer fabric members of the unit U will be unitedly maintained in the positional relationship shown in FIG. 4. To apply the stitching 5ª, the unit U, as shown in FIG. 4, is preferably first reversed, or turned inside out, so that the stitching may take place from the reverse side of the unit. The upper half of the rear section of the unit U, which extends above the dot-and-dash center line 6 in FIG. 4, is then turned outwardly and downwardly so that it occupies the position shown in FIG. 5.

When the unit U has attained the configuration shown in FIG. 5, the substantially semicircular rear section or portion thereof constitutes a collar formation C and the substantially semicircular front section or portion thereof constitutes a placket formation P. It will be noted that the said collar and placket formations are combined, or integrally united with each other and that the bottom edge of these formations is continuous, or endless, so that it serves as a continuous attaching edge which enables sewing the collar and placket unit to an appropriate or corresponding opening defining edge O provided therefor in a shirt or garment body B of the type shown in FIG. 25. The indicated garment body B is of the usual type that comprises a front section F, a rear section R, which sections are made of woven material and joined at their upper ends by a seam, as usual and as indicated.

The sewing procedure followed in joining the said corresponding attaching edges of the unit U, as shown in FIG. 5, and the shirt body B shown in FIG. 25, is substantially the same as that usually followed in connection with any shirt or other garment manufacturing practice that includes separate collar and placket inserts except, of course, that the sewing procedure, in this instance, can be continuously effected. The corresponding continuous attaching edges of the collar and placket unit U, as shown in FIG. 5, and the shirt body B shown in FIG. 25, are respectively substantially indicated by the stippled areas in said figures.

FIG. 6 shows the appearance of the front of a shirt 7, having the single unit collar and placket insert unit U of FIG. 5 embodied therein in its finished or completed form. That is to say, after the two sections P¹ and P² of the placket forming section P have been arranged in proper overlapping relation with each other and after buttons 8, buttonholes 9 and ornamental stitching 10 have been applied to the unit U as indicated. The application of such items as buttons, buttonholes and ornamental stitching can, of course, be carried out in accordance with the usual prior art practice, i.e., they can be applied after the unit U, as shown in FIG. 5, has been sewed in proper place in the opening provided therefor in the shirt body B. However, the unit U of FIG. 5 can also be readily provided with such items before it is sewed in proper place in the opening provided therefor in the shirt body B, since the said unit U is in the form of a one piece material structure that permits exact alignment manipulation and arrangement of the various parts thereof in the manner required to effect the provision of said items. This feature of making it possible to provide the unit U of FIG. 5 with the indicated items, either before or after the unit U is sewed to the shirt body, constitutes a unique attribute of my invention in that it provides greater distribution possibilities of this type work among the operators of a shop and thereby tends to minimize work bottleneck and lay-off conditions from developing that result when certain operations can only be performed at one point in the garment manufacturing procedure.

It will be noted that the placket forming section P of the unit U (as shown in FIG. 5) is continuous at the front central area thereof. This area forms the lower end placket portion P³ of the placket arrangement shown in FIG. 6, which portion extends between the two placket sections P¹ and P² when the latter have been arranged in overlapping relation with each other, as more particularly indicated by FIG. 8. This continuous lower end placket portion P³ readily lends itself to numerous different folding possibilities and arrangements, such that various lower end placket termination shapes, configurations or designs can be attained. The V-shaped design of the lower end placket portion P³ shown in FIG. 6 illustrates one such design, as it appears when the placket is closed. FIG. 7 illustrates the appearance of said portion P³ as it appears when the placket is opened or unbuttoned. Other such lower end placket designs are exemplified in connection with the modified combination collar and placket insert units of my invention hereinafter described. This feature constitutes another unique attribute of my invention in that it not only provides great latitude in the choice of lower end placket design formations or shapes, but, due to the continuous construction thereof, also adds strength, durability and all other advantages of such a construction to the shirts or garments having my collar and placket units embodied therein.

*Embodiment No. 2*

FIGS. 9 to 18 inclusive disclose a second, or modified form of single unit collar and placket insert structure in accordance with my invention. In this instance, the insert structure is made of suitable flat, woven, knitted or other type textile materials from which individual collar and placket inserts are ordinarily produced.

To begin with, two pattern pieces are cut from such material, i.e., a pattern piece 11 substantially as shown in FIG. 9 and a pattern piece 12, substantially as shown in FIG. 10.

The pattern pieces 11 and 12 are of such size and shape that when united as hereinafter explained, they combinedly form a single unit collar and placket insert structure for shirts and the like, in similar manner as the unit U previously described.

In the pattern piece 11, the rear section 11ª constitutes a collar forming element and the two similar front sections 11ᵇ constitute two placket forming members.

In the pattern piece 12, the central section 12ª constitutes a placket forming member and the outer ends 12ᵇ constitute collar forming elements.

The procedure followed in converting the pattern pieces 11 and 12 into a single unit collar and placket insert structure, is substantially as follows:

The outer sections 11ᵇ of the pattern piece 11 are brought together so as to effect a substantially circular formation and the corresponding free edges of the sections 11ᵇ are then joined by an inwardly extending front vertical seam arrangement, as indicated at 13 in FIG. 11.

Similarly, the outer sections 12ᵇ of the pattern piece 12 are brought together so as to effect a substantially circular formation and the corresponding free edges of the sections 12ᵇ are then joined by an inwardly extending rear vertical seam arrangement, as indicated at 14 in FIG. 12.

When the pattern piece 12, as disclosed in FIG. 12, is collapsed or substantially flattened and seen from the side thereof, it will have an appearance substantially as indicated in FIG. 13.

Likewise, when the pattern piece 11, as shown in FIG. 11, is collapsed or substantially flattened and seen from the side thereof, it will have an appearance substantially as indicated in FIG. 14.

The pattern pieces 11 and 12 are next inserted, one within the other, as indicated in FIG. 16, so that the combined pieces, when seen from the side, will have an appearance substantially as indicated by FIG. 15.

At this stage of the procedure, the combined pattern pieces 11 and 12 are joined along their upper edges by through stitches 15, so that the inner and outer pattern pieces will be unitedly maintained in the positional relationship shown in FIGS. 15 and 16. To apply the through stitches 15, the combined pattern pieces 11 and 12, as shown in FIGS. 15 and 16, may be reversed, or combinedly turned inside out, so that the stitching may take place from the reverse side, as in the case of the unit U of FIGS. 4 and 5 previously described.

When a two ply structure has been attained, substantially in accordance with FIG. 15, the structure forms a unit $U^1$, having a rear portion that constitutes a collar formation $C^1$ and a front portion that constitutes a placket formation $P^4$, in substantially similar manner as the unit U of FIG. 5. The collar formation $C^1$, as shown in FIG. 15, is converted into final collar forming shape, by turning outwardly and downwardly the portion thereof which extends above the dot-and-dash line 16.

It will be noted that, in the single unit collar and placket insert structure $U^1$ of FIG. 15, the collar formation $C^1$ and the placket formation $P^4$ are also integrally united in longitudinally alternating continuity with each other, the same as the unit U of FIG. 5. Furthermore, that the bottom edge of the said formations $C^1$ and $P^4$ is continuous, or endless, so that it serves as a continuous attaching edge which enables sewing of the unit $U^1$ to an appropriate or corresponding opening defining edge provided therefor in a shirt or garment body B of the type shown in FIG. 25, such as there partly indicated by the dot-and-dash line $O^1$.

The location of the continuous attaching edge of the single unit collar and placket insert structure $U^1$ of FIG. 15, is partly indicated by the stippled area at the bottom of the latter, said attaching edge extending continuously about the entire unit $U^1$.

The unit $U^1$ of FIG. 15 is shown as provided on the inside with so-called "reverse" or placket enlargements or extensions 17, at each side of the two complementary members of the placket $P^4$ thereof, to indicate that such extensions, which are well known, may be included in the insert structure of my invention, if desired. The extensions 17 overlap the outer attaching edges of the placket members on the inside of the shirt and thereby effect neat appearance of the placket arrangement when the shirt is opened.

As in the case of the previously described unit U, the sewing procedure followed in joining the corresponding attaching edges of the unit $U^1$ and the shirt body B, is substantially the same as that usually followed in connection with any shirt or other garment manufacturing practice that includes separate collar and placket inserts, except, of course, that the sewing procedure, in this instance, can again be continuously effected.

FIG. 17 shows the appearance of the front of a shirt 18, having the single unit collar and placket insert unit $U^1$ of FIG. 15 embodied therein in its finished or completed form. That is to say, after a buttonhole forming cord 19 has been sewed in position between the outer two ply edge structure of one of the members of placket forming section $P^4$ thereof and buttons 20 and ornamental stitchings 21 have been added in the usual manner of the prior art practice. As in the case of the previously described embodiment No. 1 of my invention, the application to the unit $U^1$ of such items as the buttons 20, a buttonhole cord 19 and ornamental stitchings 21, can be carried out in accordance with the usual prior art practice, or the unit $U^1$ may be provided with such items before it is sewed in proper place in the shirt body opening, to thereby attain the advantages previously pointed out.

It will be noted that, in the placket arrangement shown in FIG. 17, the bottom end $P^5$ of the continuous placket structure $P^4$ is folded in a manner providing a substantially "envelope" type design arrangement that differs from the design of the placket end $P^3$ of FIG. 6. When opened, or unbuttoned, the placket end $P^5$ has the appearance substantially as shown in FIG. 18. This continuous placket end structure $P^5$ provides the same attributes and advantages previously indicated in connection with the description of the placket end $P^3$ of FIGS. 6 and 7.

*Embodiment No. 3*

FIGS. 19 to 24 inclusive disclose another or modified form of single unit collar and placket insert structure in accordance with my invention. This insert structure is also made of suitable flat, woven, knitted or other textile materials of the variety ordinarily utilized in producing individual collar and placket inserts.

In this instance, two pattern pieces are cut from such a material, i.e., a pattern piece 22, substantially as shown in FIG. 19 and a pattern piece 23, substantially as shown in FIG. 20.

The pattern pieces 22 and 23 are of such size and shape that when united, as hereinafter explained, they combinedly form a single unit collar and placket insert structure for shirts and the like, which is similar to the insert structures U and $U^1$ previously described.

The present insert structure differs from the previously described embodiment No. 2 in that the respective pattern pieces 22 and 23 are joined end to end in such manner that the pattern piece 23 becomes a collar formation and the pattern piece 22 becomes a placket formation. In other words, instead of the pattern pieces each including two integral sections, namely, a combined collar section and placket section, as in the embodiment No. 2 of my invention, the pattern pieces 22 and 23 each constitute a separate such section. The pattern piece 23 of FIG. 20 is, accordingly, so shaped as to provide a complete collar formation $C^2$ and the pattern piece 22 of FIG. 19 is so shaped as to provide a complete placket formation $P^6$.

The procedure followed in converting the pattern pieces 22 and 23 into a single unit collar and placket insert structure, is substantially as follows:

The outer sections of the two pattern pieces 22 and 23 are first joined with each other by two rows of stitches, one of which stitch rows is indicated at 24 in FIG. 21, the other stitch row joining the opposite outer sections of the pattern pieces in similar manner. When so joined, an integral insert unit will have been formed as indicated by FIG. 21-A, having a continuous or endless bottom attaching edge area as substantially indicated by the stippled area in FIG. 21.

The upper sections of the pattern pieces 22 and 23, above the dot-and-dash center line L shown in FIG. 21, when turned outwardly and downwardly will result in a unitary insert structure $U^2$ as shown in FIG. 22, having a rear portion that constitutes a collar formation $C^2$ and a front portion that constitutes a placket formaion $P^6$. It will be noted that the said collar and placket formations are arranged in longitudinally alternating continuity with each other, in similar manner as the units U and $U^1$ previously described.

The sewing procedure followed in joining the corresponding attaching edges of the insert unit $U^2$ and the shirt body B, is substantially the same as the procedure previously explained in connection with the description of the insert units U and $U^1$ and may be continuously effected.

FIG. 23 shows the appearance of the front of a shirt 25, having the single unit collar and placket insert unit $U^2$ of FIG. 22 embodied therein in its finished or completed form and with ornamental cords 26 and buttons 27 added. As previously pointed out, such items as the ornamental cord or cords 26 and buttons 27 can be added either before or after the unit $U^2$ is attached to the shirt body.

In FIG. 23, there is shown at the lower end of the placket $P^6$ another form of continuous placket end design formation $P^7$ of the type that can be provided by utilizing a single unit insert structure in accordance with my invention. FIG. 24 discloses the placket end $P^7$ substantially as it appears when opened or unbuttoned. This continuous placket end structure $P^7$ also provides the attributes and advantages previously indicated in connection with the description of the packet ends P³ and P⁵.

*Modifications*

It will be apparent to those skilled in this art that the improvements specifically shown and described can be changed and modified in various ways without departing from the invention herein disclosed. For example, the various unitary collar and placket insert structures of my invention can be provided in single ply formation or in double ply formation, lining materials can be added at one point or another as desired, between the double ply formations, or otherwise, the overlapping placket sections can be arranged so that they can be buttoned from left to right, or vice versa, and other types of placket fastining means can be provided, such as zippers, etc., all in accordance with the usual well known practices and procedures followed in the manufacture of shirts and the like for men, women, children and infants that are provided with collar and placket structures.

It will also be understood that the insert structures can be provided in substantially any desired collar and placket style and size combination and that the shirt body opening for receiving such combinations can be correspondingly shaped so as to enable attachment of the insert structures to the shirt body in the manner indicated.

I claim:

1. A unitary attachment for shirts and the like comprising: two elongated attachment segments that are arranged in opposed endwise combined annular relation with each other, one of which attachment segments has means for forming a collar, and the other of which attachment segments has a loop-like placket-forming configuration the leg portions of which are adapted to establish a shirt front opening arrangement and the bight portion of which forms an integral connection between the lower ends of said leg portions that is designed to provide a selected one of a plurality of placket terminations of different ornamental shape.

2. A unitary attachment in accordance with claim 1, wherein said attachment segments are integrally formed from a single piece of tubular material.

3. A unitary attachment in accordance with claim 1, wherein said attachment segments are formed of flat material.

4. A unitary attachment in accordance with claim 1, wherein the respective end portions of the attachment segments are united with each other in lengthwise aligned relation.

5. A garment of the character described having in combination with a garment body member that is provided with a collar and placket receiving opening at its upper end; of a unitary attachment secured in said opening which attachment comprises two elongated attachment segments that the arranged in opposed endwise combined annular relation with each other, one of which attachment segments has means that forms a collar, and the other of which attachment segments has a loop-like placket-forming configuration the leg portion of which establish a garment front opening arrangement and the bight portion of which forms an integral connection between the lower ends of said leg portions that is designed to provide a selected one of a plurality of placket terminations of different ornamental shape.

6. A garment of the character described having in combination with a garment body member that is provided with a collar and placket receiving opening at its upper end; of an elongated collar-forming structure secured in said opening; and an elongated loop-like placket-forming structure secured in said opening in opposed endwise connected relation with said collar-forming structure, the leg portions of which loop-like placket-forming structure are adapted to establish a garment front opening arrangement, and the bight portion of which loop-like placket-forming structure forms an integral connection between the lower ends of said leg portions that is designed to provide a selected one of a plurality of placket terminations of different ornamental shape.

References Cited in the file of this patent
UNITED STATES PATENTS 2,387,060     Corbi _____ Oct. 16, 1945

FOREIGN PATENTS 522,784     Canada _____ Mar. 20, 1956